US011525014B2

(12) United States Patent
Uraki et al.

(10) Patent No.: US 11,525,014 B2
(45) Date of Patent: Dec. 13, 2022

(54) CELLULOSE ACETATE, CELLULOSE ACETATE FIBER, CELLULOSE ACETATE COMPOSITION, METHOD FOR PRODUCING CELLULOSE ACETATE, AND METHOD FOR PRODUCING CELLULOSE ACETATE COMPOSITION

(71) Applicants: NATIONAL UNIVERSITY CORPORATION HOKKAIDO UNIVERSITY, Sapporo (JP); NIPPON PAPER INDUSTRIES CO., LTD., Tokyo (JP); DAICEL CORPORATION, Osaka (JP)

(72) Inventors: Yasumitsu Uraki, Sapporo (JP); Haruo Konno, Tokyo (JP); Shu Shimamoto, Tokyo (JP)

(73) Assignees: NATIONAL UNIVERSITY CORPORATION HOKKAIDO UNIVERSITY, Sapporo (JP); NIPPON PAPER INDUSTRIES CO., LTD., Tokyo (JP); DAICEL CORPORATION, Osaka (JP)

( * ) Notice: Subject to any disclaimer, the term of this patent is extended or adjusted under 35 U.S.C. 154(b) by 0 days.

(21) Appl. No.: 17/056,468

(22) PCT Filed: Jun. 12, 2019

(86) PCT No.: PCT/JP2019/023283
§ 371 (c)(1),
(2) Date: Nov. 18, 2020

(87) PCT Pub. No.: WO2019/240169
PCT Pub. Date: Dec. 19, 2019

(65) Prior Publication Data
US 2021/0221918 A1    Jul. 22, 2021

(30) Foreign Application Priority Data
Jun. 12, 2018    (JP) .............................. JP2018-111930

(51) Int. Cl.
| C08B 3/06 | (2006.01) |
| C08B 1/00 | (2006.01) |
| C08L 1/12 | (2006.01) |
| C08L 57/00 | (2006.01) |
| C08L 87/00 | (2006.01) |
| D01F 2/28 | (2006.01) |

(52) U.S. Cl.
CPC ................ *C08B 3/06* (2013.01); *C08B 1/003* (2013.01); *C08L 1/12* (2013.01); *C08L 57/00* (2013.01); *C08L 87/00* (2013.01); *D01F 2/28* (2013.01)

(58) Field of Classification Search
CPC .............. C08B 3/06; C08B 1/003; C08L 1/12
See application file for complete search history.

(56) References Cited

U.S. PATENT DOCUMENTS

| 9,382,335 | B2* | 7/2016 | Toyama | .................... C08B 3/00 |
| 2007/0059458 | A1* | 3/2007 | Nishiura | .................... C08J 5/18 |
| | | | | 428/1.31 |
| 2014/0073722 | A1 | 3/2014 | Shiramizu et al. | |
| 2014/0073776 | A1 | 3/2014 | Shiramizu et al. | |
| 2017/0145118 | A1* | 5/2017 | Hosaka | ....................... B02C 7/06 |
| 2017/0260294 | A1 | 9/2017 | Toyama et al. | |
| 2019/0127889 | A1 | 5/2019 | Uraki et al. | |
| 2019/0389977 | A1* | 12/2019 | Suzuki | ....................... C08L 1/12 |
| 2021/0171663 | A1 | 6/2021 | Kuwana et al. | |

FOREIGN PATENT DOCUMENTS

| CN | 107158800 A * | 9/2017 |
| JP | 2013-043984 A | 3/2013 |
| JP | 2013-044076 A | 3/2013 |
| JP | 2013-49867 A | 3/2013 |
| JP | 2017-165946 A | 9/2017 |
| JP | 2018-058941 A | 4/2018 |
| WO | WO 2010/023707 A1 | 3/2010 |

OTHER PUBLICATIONS

Kobayashi et al., "Investigation of the structure and interaction of cellulose triacetate I crystal using ab initio calculations," Carbohydrate Research (2014), vol. 388, pp. 61-66.
Nishino et al, "Elastic Modulus of the Crystaline Regions of Cellulose Triesters," Journal of Polymer Science Part B: Polymer Physics (1995), vol. 33, pp. 611-618.
Roche et al., "Three-Dimensional Crystalline Structure of Cellulose Triacetate $II^{1a}$," Macromolecules (Jan.-Feb. 1978), vol. 11, No. 1,pp. 86-94.
Sikorski et al., "Crystal Structure of Cellulose Triacetate I," Macromolecules (2004), vol. 37, pp. 4547-4553.
Stipanovic, A. J. and A. Sarko, "Molecular and crystal structure of cellulose triacetate I: a parallel chain structure," Polymer (Jan. 1978), vol. 19, pp. 3-8.
Sugiyama et al., "Electron Diffraction Study on the Two Crystalline Phases Occurring in Native Cellulose from an Algal Cell Wall," Macromolecules (1991), vol. 24, pp. 4168-4175.
Wada et al., "X-ray Diffraction Study of the Thermal Expansion Behavior of Cellulose Triacetate I," Journal of Polymer Science Part B: Polymer Physics (Jan. 21, 2009), pp. 517-523.

(Continued)

Primary Examiner — Leigh C Maier
Assistant Examiner — Everett White
(74) Attorney, Agent, or Firm — Birch, Stewart, Kolasch & Birch, LLP (57) ABSTRACT

An object of the present invention is to provide cellulose acetate that has excellent compatibility with a resin, can reinforce a resin, and has excellent thermal stability. An embodiment of the present invention is cellulose acetate having a cellulose triacetate I crystal structure, wherein a temperature at which a weight loss relative to weight at 100° C. reaches 5% is 200° C. or higher when the cellulose acetate is heated at a heating rate of 10° C./min under a nitrogen atmosphere.

11 Claims, 5 Drawing Sheets

(56) References Cited

OTHER PUBLICATIONS

Extended European Search Report for European Application No. 19819650.3, dated Feb. 16, 2022.
Chinese Office Action dated Apr. 28, 2022 for CN Application No. 201980019003.0 with English Translation.
Japanese Office Action dated May 17, 2022 for JP Application No. 2018-111930 with English Translation.

\* cited by examiner

CELLULOSE ACETATE, CELLULOSE ACETATE FIBER, CELLULOSE ACETATE COMPOSITION, METHOD FOR PRODUCING CELLULOSE ACETATE, AND METHOD FOR PRODUCING CELLULOSE ACETATE COMPOSITION

TECHNICAL FIELD

The present invention relates to cellulose acetate, a cellulose acetate fiber, a cellulose acetate composition, a method for producing cellulose acetate, and a method for producing a cellulose acetate composition.

BACKGROUND ART

A natural cellulose fiber is a fiber having, as a minimum unit, a microfibril that is an assembly of single crystal fibers and has a diameter of about 3 nm. A fiber obtained by extracting this microfibril by chemical and physical treatment is a so-called cellulose nanofiber. The cellulose nanofiber is considered to have a strength five times or more that of steel in spite of the fact that its density (specific gravity) is one-fifth of that of steel, and a low linear thermal expansion coefficient of one-fiftieth of that of glass. Therefore, the cellulose nanofibers are expected to be used as reinforcing fibers that are combined with another material such as a resin material, to enhance the strength of the material.

Further, the cellulose nanofibers themselves or a composite material obtained by combining the cellulose nanofibers with another material, such as a resin material, are/is also expected to function as a transparent material. However, natural cellulose is rich in hydroxyl groups and is hydrophilic, and therefore has poor compatibility for hydrophobic nonpolar commodity plastics and are inferior in dispersibility in these resins, thus not significantly contributing to the improvement of the strength of the resin materials. Thus, studies have been conducted to chemically modify the hydroxyl groups of natural cellulose to be hydrophobic and to improve the compatibility with hydrophobic, non-polar, commodity resins.

Patent Document 1 describes a fiber-reinforced resin composition containing (A) a chemically modified cellulose nanofiber and (B) a thermoplastic resin, in which a crystallinity of the chemically modified cellulose nanofiber is 42.7% or higher and 78.8% or lower; hydrogen atoms of the hydroxyl groups of the sugar chain constituting the cellulose nanofiber are substituted with acetyl groups, and a degree of substitution is 0.56 or higher and 2.52 or lower.

CITATION LIST

Patent Document

Patent Document 1: JP 6091589 B
Patent Document 2: JP 2017-165946 A

Non-Patent Literature

Non-Patent Literature 1: Takashi Nishino et al., Elastic modulus of the crystalline regions of cellulose triesters, Journal of Polymer Science Part B: Polymer Physics, March 1995, pp 611-618

Non-Patent Literature 2: Junji Sugiyama et al., Electron diffraction study on the two crystalline phases occurring in native cellulose from an algal cell wall, Macromolecules, 1991, 24 (14), pp 4168-4175

Non-Patent Literature 3: E. Roche et al., Three-Dimensional Crystalline Structure of Cellulose Triacetate II, Macromolecules, 1978, 11 (1), pp 86-94

Non-Patent Literature 4: Stipanovic A J et al., Molecular and crystal structure of cellulose triacetate I: Aparallel chain structure, Polymer, 1978, 19 (1), pp 3-8.

Non-Patent Literature 5: Masahisa Wada et al., X-ray diffraction study of the thermal expansion behavior of cellulose triacetate I, Journal of Polymer Science Part B: Polymer Physics, Jan. 21, 2009, pp 517-523

Non-Patent Literature 6: Takanori Kobayashi et al., Investigation of the structure and interaction of cellulose triacetate I crystal using ab initio calculations, Carbohydrate Research, Mar. 31, 2014, Volume 388, pp 61-66

Non-Patent Literature 7: Pawel Sikorski et al., Crystal Structure of Cellulose Triacetate I, Macromolecules, 2004, 37 (12), pp 4547-4553

SUMMARY OF INVENTION

Technical Problem

Although Patent Document 1 describes the above, it is typically impossible to chemically modify the hydroxyl groups of natural cellulose to a higher degree while retaining the crystal structure of natural cellulose.

The chemically modified cellulose nanofiber of Patent Document 1 has a degree of substitution of acetyl groups of 0.56 or higher and 2.52 or lower, and this means that the chemically modified cellulose nanofiber of Patent Document 1 contains a cellulose nanofiber in which 80% or greater of the hydroxyl groups are acetylated, that is, a highly chemically modified cellulose nanofiber. However, if such chemical modification takes place at the molecular level, it would be impossible to retain a natural cellulose crystallinity of 42.7% or higher while acetylating 80% or greater of all the hydroxyl groups. Thus, the chemically modified cellulose nanofiber of Patent Document 1 can only be understood as a mixture of a highly acetylated cellulose and an unreacted and highly crystalline cellulose.

Highly acetylated cellulose cannot have a cellulose triacetate I crystal structure. This is because N-methylpyrrolidone used as an acylation reaction solvent dissolves a cellulose triacetate I crystal. That is, in the chemically modified cellulose nanofiber of Patent Document 1, most of the acetylated portions at the molecular level are understood to have neither natural cellulose crystal structure nor cellulose triacetate I crystal structure, and to retain no microfibril structure of natural cellulose.

After all, if cellulose is highly chemically modified to increase the compatibility with a resin, the microfibrils of natural cellulose cannot be retained as they are.

Patent Document 2 describes a cellulose acetate fiber having a cellulose triacetate I crystal structure, which is the only chemically modified cellulose crystal having the same parallel-chain structure as that of natural cellulose, and retaining a fiber form derived from the natural cellulose microfibril structure.

The disclosure of Patent Document 2 is a clever attempt to utilize the natural cellulose microfibril structure for creating materials while highly chemically modifying cellulose. However, according to a study by the present inventors, when sulfuric acid is used as a catalyst for acetylation, sulfuric acid is introduced into cellulose through an ester bond as a side reaction, and this is liberated later and significantly impair the thermal stability of the material. In addition, use of a catalyst other than sulfuric acid causes no problem in terms of thermal stability but leads to difficulty in performing a defibrillation process with a homogenizer in a medium, such as water, or requires long processing time, large processing energy, or both long processing time and large processing energy. Furthermore, defibrillation performed in a resin by kneading with the resin without performing a defibrillation process with a homogenizer also leads to difficulty in defibrillation or requires long processing time, large processing energy, or both long processing time and large processing energy.

A plurality of techniques for using sulfuric acid as a catalyst but obtaining cellulose acetate with a reduced combined sulfuric acid content has been known in the art, but these techniques do not retain the cellulose triacetate I crystal.

As described above, there is no known cellulose acetate that has excellent compatibility with a resin, can reinforce a resin, and has excellent thermal stability.

An object of the present invention is to provide cellulose acetate that has excellent compatibility with a resin, can reinforce a resin, and has excellent thermal stability.

Solution to Problem

A first aspect of the present invention relates to cellulose acetate having a cellulose triacetate I crystal structure, wherein a temperature, at which a weight loss relative to weight at 100° C. reaches 5%, is 200° C. or higher when the cellulose acetate is heated at a heating rate of 10° C./min under a nitrogen atmosphere.

In the cellulose acetate, a temperature at which the weight loss reaches 5% may be 220° C. or higher.

In the cellulose acetate, a temperature at which the weight loss reaches 5% may be 250° C. or higher.

In the cellulose acetate, a combined sulfuric acid content may be 20 ppm or greater and 500 ppm or less.

A second aspect of the present invention relates to a cellulose acetate fiber composed of the cellulose acetate.

A third aspect of the present invention relates to a cellulose acetate composition containing the cellulose acetate fiber and a resin.

A fourth aspect of the present invention relates to a method for producing cellulose acetate, the method including: acetylating fibrous raw material cellulose by reacting the fibrous raw material cellulose with acetic anhydride in a solvent containing a poor solvent for cellulose acetate and acetic acid; separating cellulose acetate obtained by the acetylation as a solid; washing and drying the solid; and dispersing fibrous cellulose acetate in water under an acidic condition, the fibrous cellulose acetate being obtained by the washing and the drying in water under an acidic condition.

In the method for producing cellulose acetate, the method may include pretreating the raw material cellulose by bringing the raw material cellulose into contact with water, acetic acid, or water and acetic acid prior to the acetylation.

A fifth aspect of the present invention relates to a method for producing cellulose acetate composition, the method including melt-kneading a resin in a presence of the cellulose acetate fiber.

Advantageous Effects of Invention

The present invention can provide cellulose acetate that has excellent compatibility with a resin, can reinforce a resin, and has excellent thermal stability.

DESCRIPTION OF EMBODIMENTS

Hereinafter, an example of a preferred embodiment will be specifically described.

Cellulose Acetate

Cellulose acetate of the present disclosure has a cellulose triacetate I crystal structure, in which a temperature, at which a weight loss relative to weight at 100° C. reaches 5%, is 200° C. or higher when the cellulose acetate is heated at a heating rate of 10° C./min under a nitrogen atmosphere.

Cellulose Triacetate I Crystal Structure

The fact that the cellulose acetate has a cellulose triacetate I (hereinafter also referred to as "CTA I") crystal structure can be identified by the appearance of typical peaks at two positions around $2\theta=7.6°$ (from 7.2 to 8.0°) and $2\theta=15.9°$ (from 15.5 to 16.3°) in a diffraction profile obtained from an X-ray diffraction photograph using CuKα ($\lambda=1.542184$ Å). For an example of such typical peaks, reference can be made to data for "CTA I CRYSTAL SAMPLE" in FIG. 1.

Similarly, the fact that cellulose acetate has a cellulose triacetate II crystal structure (hereinafter also referred to as "CTA II") can be identified by appearance of typical peaks at three positions around $2\theta=7.9$ to 8.9°, $2\theta=9.9$ to 10.9°, and $2\theta=12.6$ to 13.6°. For an example of such typical peaks, reference can be made to data for "CTA II CRYSTAL SAMPLE" in FIG. 1.

The cellulose acetate of the present disclosure has a cellulose triacetate I crystal structure and thus can have a small density and excellent strength.

The crystal structures of cellulose and cellulose acetate are now described. As the crystal structures of cellulose, there are a cellulose I crystal structure and a cellulose II crystal structure (Non-Patent Literatures 1 and 3). It is known that as the crystal structures of cellulose acetate obtained by modifying cellulose with acetyl groups, there are a cellulose triacetate I crystal structure (CTA I) and a cellulose triacetate II crystal structure (CTA II). (Non-Patent Literatures 1, and 3 to 7). The cellulose triacetate I crystal structure is considered to be a parallel-chain structure similar to that of the cellulose I crystal structure (Non-Patent Literature 4), and the cellulose triacetate II crystal structure is considered to be an antiparallel-chain structure (Non-Patent Literature 3). Further, it is considered that once a cellulose triacetate I crystal structure is converted to a cellulose triacetate II crystal structure, conversion to a cellulose triacetate I crystal structure does not occur (Non-Patent Literature 3).

The small specific gravity, high strength, and low linear thermal expansion coefficient of a cellulose nanofiber obtained from natural cellulose are considered to be due to the fact that the cellulose nanofiber has a cellulose I crystal structure (cellulose I, more precisely, cellulose I is a mixture of cellulose Iα and cellulose Iβ. (Non-Patent Literature 2))

in which all the cellulose molecular chains are oriented in the same direction to form a parallel-chain structure, and further result from the fact that the cellulose nanofiber has a microfibril fiber structure, containing a cellulose I crystal structure, in which about 36 cellulose molecular chains are assembled and arranged in parallel.

Temperature at which Weight Loss Reaches 5%

In the cellulose acetate of the present disclosure, a temperature, at which a weight loss relative to weight at 100° C. reaches 5%, is 200° C. or higher when the cellulose acetate is heated at a heating rate of 10° C./min under a nitrogen atmosphere. A temperature, at which the weight loss reaches 5%, is preferably 220° C. or higher and more preferably 250° C. or higher. This is because the cellulose acetate exhibiting such weight loss behavior has even better thermal stability. On the other hand, a temperature, at which the weight loss reaches 5%, may be 350° C. or lower.

The weight loss can be measured using a thermobalance (TG-DTA2000-S available from MAC Science Co., Ltd.). Specifically, the cellulose acetate is heated at a heating rate of 10° C./min under a nitrogen atmosphere, and the weight change (relationship between the temperature and the weight) is measured. Then, the weight loss (%) at each temperature relative to the weight of the cellulose acetate at 100° C. is calculated.

Average Degree of Substitution

The average degree of substitution of the cellulose acetate of the present disclosure is preferably 2.0 or higher and 3.0 or lower. When the average degree of substitution is 2.0 or higher and 3.0 or lower, the surfaces of cellulose acetate molecules are highly hydrophobic, and therefore the cellulose acetate has an excellent compatibility for a hydrophobic resin such as polypropylene. When the cellulose acetate is to be dispersed in a hydrophobic resin such as polypropylene, from the viewpoint of the compatibility for the resin, the upper limit of average degree of substitution of the cellulose acetate is preferably higher, most preferably 3.0, and the lower limit of average degree of substitution of the cellulose acetate is preferably 2.2 or higher, more preferably 2.8 or higher.

When the cellulose acetate is to be dispersed in polyethylene terephthalate or the like, the upper limit of average degree of substitution of the cellulose acetate fibers is preferably 3.0 or lower, more preferably 2.9 or lower. Furthermore, the lower limit is preferably 2.0 or higher and more preferably 2.2 or higher.

The average degree of substitution of the cellulose acetate can be measured by a known titration method in which cellulose acetate is dissolved in water and the average degree of substitution of the cellulose acetate is determined. For example, the following method can be used. A combined acetic acid of cellulose acetate is determined according to a method for measuring combined acetic acid specified in ASTM:D-817-91 (test methods for cellulose acetate etc.) and converted to average substitution degree by the following formula. This is the most common method for determining the average degree of substitution of the cellulose acetate.

Average degree of substitution (DS)=162.14×the combined acetic acid (%)/{6005.2−42.037×degree of acetylation (%)}

First, 1.9 g of dried cellulose acetate (sample) is precisely weighed and dissolved in 150 mL of a mixed solution of acetone and dimethylsulfoxide (volume ratio 4:1), and then 30 mL of a 1 N aqueous sodium hydroxide solution was added to saponify the cellulose acetate at 25° C. for 2 hours. Phenolphthalein is added as an indicator, and the excess sodium hydroxide is titrated with 1N-sulfuric acid (concentration factor: F). Further, a blank test is performed in the same manner, and the combined acetic acid of the sample is calculated by the following formula:

Combined acetic acid (%)={6.5×(B−A)×F}/W where A is a titration volume (mL) of 1N-sulfuric acid used for the sample, B is a titration volume (mL) of 1N-sulfuric acid used in the blank test, F is a concentration factor of 1N-sulfuric acid, and W is a weight of the sample.

Combined Sulfuric Acid Content

The cellulose acetate of the present disclosure has a combined sulfuric acid content of preferably 500 ppm or less, more preferably 300 ppm or less, even more preferably 200 ppm or less, and most preferably 100 ppm or less. This is because the cellulose acetate with such a combined sulfuric acid content has even better thermal stability. In addition, the cellulose acetate of the present disclosure has a combined sulfuric acid content of preferably 20 ppm or greater and more preferably 50 ppm or greater. This is because the cellulose acetate with a combined sulfuric acid content of less than 20 ppm would have poor dispersibility in a medium, such as water or an organic solvent, or a resin. In other words, this is because to produce the cellulose acetate of the present disclosure with particularly excellent dispersibility in a medium or a resin, sulfuric acid is preferably used as a catalyst for the acetylation in the process of producing the cellulose acetate, and when an effective amount of sulfuric acid as the catalyst for the acetylation is used, the combined sulfuric acid content in the resulting cellulose acetate is 20 ppm or higher.

The combined sulfuric acid content can be determined by the following method. A dried cellulose acetate is burned in an electric oven at 1300° C., and the sublimated sulfurous acid gas is trapped in a 10% hydrogen peroxide water and titrated with a normal aqueous solution of sodium hydroxide to measure the content in terms of $SO_4^2$. The measured value is expressed in ppm as a sulfate content in 1 g of the cellulose ester in the absolute dry state.

Viscosity-Average Degree of Polymerization

The viscosity-average degree of polymerization of the cellulose acetate of the present disclosure is preferably 50 or higher and 2500 or lower, more preferably 400 or higher and 2000 or lower, and even more preferably 1000 or higher and 1500 or lower. When the viscosity-average degree of polymerization is lower than 50, the cellulose acetate tends to have poor strength. When the viscosity-average degree of polymerization exceeds 2500, it is difficult to perform defibrillation to allow the cellulose acetate fibers to have a number-average fiber diameter of 2 nm or greater and 400 nm or smaller.

The viscosity-average degree of polymerization (DP) can be determined by a method described by Kamide et al. in Polym J., 11, 523-538 (1979).

Cellulose acetate is dissolved in dimethylacetamide (DMAc) and a solution having a concentration of 0.002 g/mL is prepared. Then, the specific viscosity ($\eta_{rel}$, unit: mL/g) of this solution is determined at 25° C. by an ordinary method using an Ostwald viscometer. More specifically, the Ostwald viscometer used has efflux time in a blank test of 90 seconds to 210 seconds, the temperature of the solution to be measured is regulated in a thermostatic bath at 25±0.2° C. for 120 minutes or more, 10 mL of the solution is introduced into the Ostwald viscometer using a transfer pipette, and the efflux time of the solution is measured twice or more to determine an average as a measurement result. The measurement result is divided by the efflux time of a blank measured in the same manner to determine a specific viscosity. The natural logarithm of the thus determined specific viscosity (natural logarithmic of the specific viscosity) is divided by the concentration (unit: g/mL) to approximately determine a value of intrinsic viscosity ([η], unit: mL/g).

$$\eta_{rel}=T/T_0$$

$$[\eta]=(\ln \eta_{rel})/C$$

where T is an efflux time (in seconds) of a measurement sample, To is a efflux time (in seconds) of a solvent, and C is a concentration (g/mL).

The viscosity-average molecular weight can be determined by the following equation:

$$\text{Viscosity-average molecular weight}=([\eta]/K_m)^{1/\alpha}$$

where $K_m$ and $\alpha$ are constants. For the cellulose triacetate, $K_m$ is 0.0264 and a is 0.750.

The viscosity-average degree of polymerization can be determined by the following equation:

Viscosity-average degree of polymerization=viscosity-average molecular weight/(162.14+42.037×average degree of substitution (DS))

Cellulose Acetate Fiber

The cellulose acetate fiber of the present disclosure is composed of the cellulose acetate described above.

Number-Average Fiber Diameter

The number-average fiber diameter of the cellulose acetate fiber of the present disclosure may be 2 nm or greater and 400 nm or smaller. The number-average fiber diameter is preferably 4 nm or greater and 300 nm or smaller, and more preferably 6 nm or greater and 100 nm or smaller.

Here, the number-average fiber diameter of the cellulose acetate fiber is a value calculated from the fiber diameter (n≥6) measured based on an electron micrograph.

Cellulose Acetate Composition

Cellulose acetate composition of the present disclosure contains the cellulose acetate fiber of the present disclosure. The cellulose acetate composition according to the present disclosure is not particularly limited as long as the cellulose acetate fibers according to the present disclosure are included. Examples of the cellulose acetate composition include a liquid dispersion or a solid dispersion obtained by dispersing the cellulose acetate fibers according to the present disclosure in any liquid (liquid phase) or solid (solid phase) dispersion medium and a composite material obtained by adding the cellulose acetate fibers according to the present disclosure to a matrix.

The liquid (liquid phase) or solid (solid phase) dispersion medium or the matrix to be used for the cellulose acetate composition according to the present disclosure is not particularly limited as long as the cellulose acetate fibers according to the present disclosure can be dispersed therein, and examples thereof include resins, especially fine particulate resins such as nylon resin fine particles, organic solvents, oil paints, and aqueous paints.

The resin used as a dispersion medium or matrix for the cellulose acetate composition according to the present disclosure may be any one of a monomer, an oligomer, and a polymer. When the resin is a polymer, the polymer may be either a thermoplastic resin or a thermosetting resin.

Examples of the thermoplastic resin specifically include polyethylene resins, polypropylene resins, polystyrene resins, rubber-modified polystyrene resins, acrylonitrile-butadiene-styrene (ABS) resins, acrylonitrile-styrene (AS) resins, polymethylmethacrylate resins, acrylic resins, polyvinyl chloride resins, polyvinylidene chloride resins, polyethylene terephthalate resins, ethylene vinyl alcohol resins, cellulose acetate resins, ionomer resins, poly acrylonitrile resins, polyamide resins (such as nylon), polyacetal resins, polybutylene terephthalate resins, polylactic acid resins, polyphenylene ether resins, modified polyphenylene ether resins, polycarbonate resins, polysulfone resins, polyphenylene sulfide resins, polyetherimide resins, polyether sulfone resins, polyarylate resins, thermoplastic polyimide resins, polyamide-imide resins, polyetheretherketone resins, polyketone resins, fluororesins, syndiotactic polystyrene resins, and cyclic polyolefin resins. One of these thermoplastic resins can be used, or two or more of them can be used in combination. The thermoplastic resin may be in a molten liquid phase or in a solid phase, for example, a microparticulate solid phase.

Examples of the thermosetting resin specifically include phenol resins, urea resins, melamine resins, benzoguanamine resins, alkyd resins, unsaturated polyester resins, vinyl ester resins, diallyl (tere)phthalate resins, epoxy resins, silicone resins, urethane resins, furan resins, ketone resins, xylene resins, and thermosetting polyimide resins. One of these thermosetting resins can be used, or two or more of them can be used in combination. When the main component of the resin used in the present disclosure is a thermoplastic resin, a small amount of a thermosetting resin may be added without impairing the properties of the thermoplastic resin. On the other hand, when the main component of the resin used in the present disclosure is thermosetting resin, a small amount of a thermoplastic resin, or a monomer such as an acrylic monomer or a styrene monomer may be added without impairing the properties of the thermosetting resin.

The cellulose acetate fibers according to the present disclosure have excellent hydrophobicity, and are therefore excellent in dispersibility in the resins, especially in the hydrophobic resins, which makes it possible to obtain a uniform and high-strength composite material or dispersion.

Examples of the organic solvent may include, but are not limited to, alcohols, such as methanol, propanol, and ethanol; and aromatic hydrocarbons, such as benzene, toluene, and xylene. In addition, one of them can be used, or two or more of them can be used in combination.

Method for Producing Cellulose Acetate

A method for producing cellulose acetate of the present disclosure will be described in detail. The cellulose acetate according to the present disclosure can be produced by a method including the steps of: acetylating fibrous raw material cellulose by reacting it with acetic anhydride in a solvent containing a poor solvent for cellulose acetate and acetic acid; separating cellulose acetate obtained by the acetylation as a solid; and dispersing a fibrous cellulose acetate in water under acidic conditions, the fibrous cellulose acetate being obtained by the washing and the drying in water under acidic conditions.

It is to be noted that cellulose acetate production method in a related art can be found in JP 5543118 B and "Wood Chemistry (Volume I)" (Migita et al., published by KYORITSU SHUPPAN CO., LTD. in 1968, pp. 180 to 190). Cellulose acetate obtained by a homogenous method (i.e., a dissolution method) described in "Wood Chemistry (Volume I)" mentioned above is a fiber obtained by dry spinning a solution of cellulose acetate. Therefore, when the cellulose acetate has a crystal structure, the obtained fibers have a cellulose triacetate II crystal structure and, as described above, cannot be expected to have a high elastic modulus. Further, there is no known method for allowing cellulose acetate prepared by such a method to have a cellulose triacetate I crystal structure. Further, cellulose acetate fibers prepared by such a method, i.e., by conventional dry spinning have a fiber diameter of several tens of micrometers.
Raw Material Cellulose As raw material cellulose for the cellulose acetate according to the present disclosure, a fibrous material such as wood pulp or cotton linters can be used, and particularly, a fibrous material having a cellulose I crystal structure can be used. These raw material celluloses may be used alone or in combination of two or more.

Cotton linters will be described. Cotton linters have a high cellulose purity and contain less colored components. Therefore, cotton linters are preferred because a composition containing resulting cellulose acetate fibers and a resin or the like has high transparency.

Next, wood pulp will be described. Wood pulp is preferred because wood pulp can be stably supplied as a raw material and has a cost advantage over cotton linters.

Examples of the wood pulp include softwood pulp and hardwood pulp, and specific examples of the softwood pulp and the hardwood pulp include softwood bleached kraft pulp, hardwood bleached kraft pulp, softwood prehydrolyzed kraft pulp, hardwood prehydrolyzed kraft pulp, hardwood sulfite pulp, and softwood sulfite pulp. As will be described later, wood pulp can be disintegrated into fluff and used as disintegrated pulp. The disintegration can be performed using, for example, a disc refiner.

When the cellulose acetate according to the present disclosure is allowed to function as a transparent material, the α-cellulose content of the raw material cellulose is preferably 90 wt. % or greater in consideration of reducing the amount an insoluble residue to prevent a reduction in the transparency of the composition.

The α-cellulose content can be determined in the following manner. Pulp having a known weight is continuously subjected to extraction at 25° C. using a 17.5% aqueous sodium hydroxide solution and a 9.45% aqueous sodium hydroxide solution, and then a soluble fraction in the extraction solution is oxidized with potassium dichromate. The weight of β,γ-cellulose is determined from the volume of potassium dichromate used for oxidization. A value obtained by subtracting the weight of β,γ-cellulose from the initial weight of the pulp is defined as the weight of insoluble fraction of the pulp, that is, the weight of α-cellulose (TAPPI T203). The ratio of the weight of insoluble fraction of the pulp to the initial weight of the pulp is defined as the α-cellulose content (wt. %).
Disintegration The method for producing the cellulose acetate fibers according to the present disclosure preferably includes the step of disintegration raw material cellulose (hereinafter also referred to as a disintegration step). This makes it possible to uniformly perform an acetylation reaction in a short time. The disintegration step is particularly effective when wood pulp or the like is supplied in the form of sheets.

In the disintegration step, raw material cellulose is disintegrated by a wet disintegration or a dry disintegration. The wet disintegration is a method in which water or water vapor is added to wood pulp such as pulp sheets to grind the wood pulp. Examples of the wet disintegration include: a method in which activation by water vapor and high-shear stirring in a reactor are performed; and a method in which disintegration is performed in a dilute aqueous acetic acid solution to obtain a slurry, and then the slurry is repeatedly subjected to liquid removal and acetic acid substitution, that is, so-called slurry pretreatment is performed. The dry disintegration is a method in which wood pulp, such as pulp sheets, is directly disintegrated in a dry state. Examples of the dry disintegration include: a method in which pulp is roughly disintegrated by a disc refiner having pyramid teeth and then finely disintegrated by a disc refiner having linear teeth; and a method in which a turbo mill is used which includes a cylindrical outer case having a liner attached to its inner wall, a plurality of discs that rotate at a high speed about the center line of the outer case, and a large number of blades radially attached around the center line in such a manner that each of the blades is located between the discs, and an object to be disintegrated is supplied into the outer case and disintegrated by three kinds of impact actions caused by hitting by the blades, collision with the liner, and high-frequency pressure oscillation generated by the action of the high-speed rotating discs, the blades, and the liner.

In the method for producing the cellulose acetate according to the present disclosure, any one of these disintegration methods may be appropriately used. The wet disintegration is particularly preferred because the acetylation reaction can be completed in a short time and cellulose acetate having a high degree of polymerization can be obtained.
Pretreatment The method for producing the cellulose acetate according to the present disclosure preferably includes a pretreatment step in which disintegrated or non-disintegrated fibrous raw material cellulose is brought into contact with water, acetic acid, or water and acetic acid. The raw material cellulose may be brought into contact with water and acetic acid or may be brought into contact with only acetic acid without using water. Here, acetic acid with a concentration from 1 to 100 wt. % can be used. Acetic acid may be an aqueous solution. Water, acetic acid, or water and acetic acid can be brought into contact with raw material cellulose by, for example, adding preferably 10 to 8000 parts by weight of water, acetic acid, or water and acetic acid per 100 parts by weight of raw material cellulose.

Examples of a method for bringing raw material cellulose into contact with acetic acid include a method in which raw material cellulose is brought into direct contact with acetic acid and a method in which raw material cellulose is brought into contact with water to prepare a water-containing wet cake and acetic acid is added to the wet cake.

Examples of the method in which raw material cellulose is brought into direct contact with acetic acid include: a method in which acetic acid or acetic acid containing from 1 to 10 wt. % of sulfuric acid (sulfur-containing acetic acid) is added in one step; and a method in which acetic acid or sulfur-containing acetic acid is added in two or more separate steps, such as a method in which acetic acid is first added and then sulfur-containing acetic acid is added after a certain period of time, or a method in which sulfur-containing acetic acid is first added and then acetic acid is added after a certain period of time. More specifically, acetic acid and/or sulfur-containing acetic acid may be added by spraying it or them onto raw material cellulose and mixing the raw material cellulose.

After acetic acid and/or sulfur-containing acetic acid is/are added to raw material cellulose, the raw material cellulose can be pretreated by allowing it to stand at 17 to 40° C. for 0.2 to 48 hours or by hermetically sealing and stirring it at 17 to 40° C. for 0.1 to 24 hours.

The case where a wet cake of raw material cellulose is prepared before the raw material cellulose is brought into contact with acetic acid will be described. Here, raw material cellulose in the form of a wet cake is simply referred to as a wet cake. The wet cake can be produced by adding water to raw material cellulose, stirring the mixture, and separating the water by filtration. The raw material cellulose can be pretreated by repeating the operation of adding acetic acid to the wet cake, stirring the mixture, and separating the acetic acid by filtration several times, for example, about three times. The solid content concentration of the wet cake just after separating water or acetic acid by filtration is preferably from 5 to 50 wt. %.

When a wet cake of raw material cellulose is prepared, the raw material cellulose is preferably softwood bleached kraft pulp or softwood bleached sulfite pulp. This is because fibers having a relatively high degree of polymerization and excellent strength can easily be obtained.

Here, the solid content concentration of the wet cake can be determined in the following manner. About 10 g of part of a wet cake (sample) is weighed on an aluminum tray (W2), dried in a vacuum dryer at 60° C. for 3 hours, cooled in a desiccator to room temperature, and weighed (W3) to determine the solid content concentration of the sample according to the following formula:

$$\text{Solid content concentration (\%)} = (W3-W1)/(W2-W1) \times 100$$

where W1 is a weight (g) of the aluminum tray, W2 is a weight (g) of the aluminum tray containing a sample before drying, and W3 is a weight (g) of the aluminum tray containing a dried sample.

When a wet cake of raw material cellulose is brought into contact with acetic acid, acetylation can be performed at a relatively low temperature in a relatively short time in an acetylation step that will be described later. And thus, temperature conditions and time conditions are easily controlled, the raw material cellulose can be handled easily, and the production efficiency of cellulose acetate can be enhanced.

Acetylation

The method for producing the cellulose acetate according to the present disclosure includes the step of acetylating fibrous raw material cellulose by reacting it with acetic anhydride in a solvent containing a poor solvent for cellulose acetate and acetic acid (hereinafter also referred to as an acetylation step). In the acetylation step, the raw material cellulose includes raw material cellulose that has been subjected to the disintegration step and the pretreatment step and raw material cellulose that has not been subjected to these steps.

More specifically, acetylation can be initiated by, for example, i) adding a poor solvent for cellulose acetate, acetic acid, acetic anhydride, and sulfuric acid to fibrous raw material cellulose. The order of addition may be different from the order above. Alternatively, acetylation may be initiated by ii) adding fibrous raw material cellulose to a mixture of a poor solvent for cellulose acetate, acetic acid, acetic anhydride, and sulfuric acid or iii) adding a previously-prepared mixture, such as a mixture of acetic acid, a poor solvent for cellulose acetate, and acetic anhydride, and sulfuric acid to fibrous raw material cellulose. The acetic acid used here is preferably one having a concentration of 99 wt. % or greater. The sulfuric acid used here is preferably one having a concentration of 98 wt. % or greater, that is, concentrated sulfuric acid.

By using a poor solvent for cellulose acetate, acetylation can be performed without breaking the microfibril fiber structure of the fibrous raw material cellulose. If the poor solvent is not used, produced cellulose acetate is dissolved in acetic acid used as a diluent in the acetylation reaction and the microfibril structure of the raw material cellulose is broken.

Needless to say, the poor solvent for cellulose acetate does not dissolve or hardly dissolves cellulose acetate. In addition, the poor solvent for cellulose acetate preferably well dissolves acetic anhydride. Examples of such a poor solvent for cellulose acetate include: aromatic hydrocarbons such as benzene, toluene, and xylene; aliphatic hydrocarbons such as cyclohexane and hexane; esters such as amyl acetate; and mixed solvents of two or more of them.

Among them, toluene and cyclohexane are preferred, and benzene is more preferred because the number of steps for separating and collecting waste liquid can be reduced or energy required for collection can be reduced.

The ratio between raw material cellulose, acetic acid, a poor solvent for cellulose acetate, and acetic anhydride used in the acetylation step will be described on for each case.

A case in which pretreatment is performed by bringing acetic acid into direct contact with raw material cellulose is described. The amount of a poor solvent for cellulose acetate is preferably from 100 to 5000 parts by weight, more preferably from 1000 to 2000 parts by weight per 100 parts by weight of raw material cellulose. The amount of acetic acid is preferably from 0 to 2000 parts by weight, more preferably from 50 to 1000 parts by weight per 100 parts by weight of raw material cellulose. The amount of acetic anhydride is preferably 200 to 1000 parts by weight, more preferably from 300 to 700 parts by weight per 100 parts by weight of raw material cellulose. When sulfuric acid is used as a catalyst, the amount of sulfuric acid is preferably from 1 to 30 parts by weight, more preferably from 5 to 20 parts by weight per 100 parts by weight of raw material cellulose.

A case in which raw material cellulose is pretreated with water to prepare a wet cake of the raw material cellulose before the raw material cellulose is brought into contact with acetic acid is described. When the solid content concentration of the wet cake is from 5 to 50 wt. %, the amount of acetic acid is preferably from 100 to 4000 parts by weight, more preferably from 200 to 3000 parts by weight, even more preferably from 1000 to 2000 parts by weight per 100 parts by weight of the wet cake. The amount of a poor solvent for cellulose acetate is preferably from 5 to 2500 parts by weight, more preferably from 50 to 1000 parts by weight per 100 parts by weight of the wet cake. The amount of acetic anhydride is preferably from 5 to 1000 parts by weight, more preferably from 10 to 500 parts by weight, even more preferably from 15 to 350 parts by weight per 100 parts by weight of the wet cake. The amount of sulfuric acid is preferably from 0.05 to 15 parts by weight, more preferably from 5 to 10 parts by weight per 100 parts by weight of the wet cake.

The temperature in the reaction system during the acetylation step is preferably from 5 to 90° C., more preferably from 10 to 75° C. In a case where the temperature in the acetylation reaction system is too high, depolymerization of the raw material cellulose is likely to proceed, causing excessive reduction in the viscosity-average degree of polymerization and reduction in the strength of the produced cellulose acetate fibers. On the other hand, in a case where the temperature in the acetylation reaction system is too low, the acetylation reaction does not proceed. As a result, the reaction requires an enormous amount of time or conversion of cellulose to cellulose acetate cannot be performed.

The temperature in the acetylation reaction system can be adjusted by externally applying no heat to the inside and outside of the reaction system under stirring conditions, and/or heating or cooling the reaction system using a heating medium or a coolant under stirring conditions such that the reaction system is adjusted to an intermediate temperature. Alternatively, the temperature in the reaction system may be adjusted by heating or cooling acetic acid, a poor solvent for cellulose acetate, acetic anhydride, and sulfuric acid in advance.

The time taken for the acetylation reaction is preferably from 0.5 to 20 hours. Here, the time taken for the acetylation reaction refers to the time from when raw material cellulose is brought into contact with a solvent, acetic anhydride, and a catalyst to start the reaction until when a product (cellulose acetate) is separated from a reaction mixture by filtration or the like. However, when chemically-modified pulp, such as TEMPO oxidized pulp, is used as raw material cellulose, the time taken for the acetylation reaction is preferably from 0.5 to 60 hours.

In the early stage of the acetylation reaction, the reaction temperature may be 5° C. or lower such that the acetylation reaction is allowed to proceed while the depolymerization reaction is suppressed to reduce the amount of unreacted materials. In this case, the reaction temperature should be increased as slowly as possible, but from the viewpoint of productivity, the reaction temperature is preferably increased in 45 minutes or less, more preferably 30 minutes or less.

The average degree of substitution can be adjusted by adjusting the temperature or time of the acetylation reaction or the composition of a reaction bath such as the amount of acetic anhydride or the amount of sulfuric acid. For example, the average degree of substitution can be increased by increasing the temperature, prolonging the time, increasing the amount of sulfuric acid, or increasing the amount of acetic anhydride.

Separation

The method for producing cellulose acetate of the present disclosure includes separating cellulose acetate obtained by the acetylation as a solid (hereinafter also referred to as the separation). The separation can be performed, for example, by filtering the reaction mixture of the acetylation reaction. The filtration may be suction filtration.

Washing and Drying

The method for producing the cellulose acetate according to the present disclosure includes the step of washing and drying the solid (hereinafter also referred to as a washing and drying step). The washing is not particularly limited as long as at least a small amount of a poor solvent for cellulose acetate, acetic acid, acetic anhydride, sulfuric acid, and a sulfate salt can be removed. More specifically, the washing is preferably performed by, for example, separating cellulose acetate obtained as a solid by filtration and then washing the solid with a poor solvent for cellulose acetate, an alcohol, and water in this order. When washing is carried out in this order, the volatile matter in the wet cake after the washing is mainly water, and therefore the amount of an unnecessary organic solvent remaining in a final product can be reduced. If an alcohol or water is used without using a poor solvent, acetic anhydride remaining in the solid reacts with sulfuric acid, in which case it is necessary to take measures against heat generation. Further, in a case where an alcohol is not used, a poor solvent for cellulose acetate cannot be sufficiently removed from the solid because the poor solvent is not mixed with water.

The poor solvent for cellulose acetate used in the washing step is preferably the same as the poor solvent for cellulose acetate used in the acetylation step for the reason that the number of steps can be reduced in the collection and separation of liquid waste.

The alcohol may be any of aliphatic alcohols, alicyclic alcohols, aromatic alcohols, and the like, and may be any of monohydric alcohols, dihydric alcohols, and trihydric or higher polyhydric alcohols. Among these alcohols, ethanol is preferred in terms of dangerous and hazardous properties of an organic solvent remaining in a final product.

A drying method is not particularly limited, and may be a known method such as natural drying, air drying, heat drying, vacuum drying, or freeze drying. Among them, freeze drying is particularly preferred because unnecessary pyrolysis can be avoided.

Dispersion in Water Under Acidic Conditions

The method for producing cellulose acetate of the present disclosure includes dispersing a fibrous cellulose acetate in water under acidic conditions, the fibrous cellulose acetate being obtained by the washing and the drying in water under acidic conditions.

The pH of the water under acidic conditions is to be lower than 7. For example, the pH is preferably 1.5 or higher and 6 or lower.

Specifically, for example, a strong acid or a weak acid, such as sulfuric acid, hydrochloric acid, and acetic acid, is used to adjust the proton concentration in the dispersion liquid of the fibrous cellulose acetate to 0.1 mM or higher and 100 mM or lower. After stirring and dispersing the fibrous cellulose acetate in water, an acidic aqueous solution, such as a high concentration aqueous sulfuric acid solution, may be added to adjust the proton concentration.

The amount of water may be 10 parts by weight or greater and 1000 parts by weight or less relative to 10 parts by weight of the cellulose acetate.

The temperature of the dispersion liquid of the fibrous cellulose acetate is preferably adjusted to, for example, 20° C. or higher and 100° C. or lower. In addition, the stirring time of the dispersion liquid may be, for example, 0.1 hours or longer and 100 hours or shorter.

Defibrillation

The method for producing cellulose acetate fibers according to the present disclosure may include the separation, the step of washing, and the step of drying after the step of dispersing the fibrous cellulose acetate in water, and in addition, may further include the step of suspending the solid in water or an organic solvent containing water and defibrillating the solid with the use of a homogenizer. In the step of defibrillating, the cellulose acetate can be defibrillated into finer fibers.

The suspension of the solid in water or an organic solvent containing water will be described. The suspension can be performed by, for example, adding water to cellulose acetate and stirring the mixture with the use of a homodisper at 3000 rpm for 10 to 60 minutes. At this time, the amount of cellulose acetate is preferably from 0.1 to 10 wt. %, more preferably from 0.5 to 5.0 wt. % with respect to the amount of water or an organic solvent containing water. In the defibrillation step that will be described later, in a case where the solid content concentration is 0.1 wt. % or less, the amount of a liquid to be treated is too large, which reduces industrial production efficiency. On the other hand, if the solid content concentration is 10 wt. % or greater, there is a case where the defibrillation step does not proceed due to the occurrence of clogging in a defibrillation device.

Here, examples of the organic solvent used in the defibrillation include methanol, ethanol, 2-propanol, acetone, tetrahydrofuran, and methyl acetate. In addition, a mixture of these organic solvents and water can be also used.

A device used for defibrillation is not particularly limited, but is preferably one that can apply a strong shearing force, such as a high-speed rotation device, a colloid mill, a high-pressure device, a roll mill, and an ultrasonic device. Particularly, a wet high- or ultrahigh-pressure homogenizer that can apply a pressure of 50 MPa or greater and a strong shearing force to the dispersion liquid is preferably used to efficiently perform defibrillation. The pressure is more preferably 100 MPa or greater, even more preferably 140 MPa or greater. Prior to defibrillation and dispersion with the use of a high-pressure homogenizer, if necessary, the cellulose acetate may be subjected to pretreatment using a known mixing, stirring, emulsification, or dispersing device such as a high-speed shear mixer.

Here, when the pressure is 50 MPa or greater, resulting cellulose acetate fibers can have a number-average fiber diameter of 400 nm or less, and when the pressure is 100 MPa or greater, the number-average fiber diameter can be made smaller.

In the method for producing cellulose acetate according to the present disclosure, fibrous raw material cellulose is acetylated in a solvent containing a poor solvent for cellulose acetate and then defibrillated using a homogenizer. And thus, resulting cellulose acetate can maintain a microfibril fiber structure of natural cellulose.

Production of Cellulose Acetate Composition

A method for producing the cellulose acetate composition according to the present disclosure will be described in detail. The cellulose acetate composition according to the present disclosure can be produced by, for example, mixing the cellulose acetate fibers according to the present disclosure with a matrix or a dispersion medium. A composite material or dispersion using a resin as a matrix or a dispersion medium can be prepared by melt-kneading the resin in the presence of the cellulose acetate fibers. A dispersion liquid in which the cellulose acetate fibers are dispersed in a liquid dispersion medium can be prepared by mixing the cellulose acetate fibers and the dispersion medium and then treating the mixture with a disperser until a dispersion liquid is formed.

The cellulose acetate may be mixed with a resin after the defibrillation into finer fibers, or the cellulose acetate may be mixed into a resin without defibrillation into finer fibers and defibrillated into finer fibers after mixed with the resin by treating with appropriate shear, temperature, and time.

The cellulose acetate, the cellulose acetate fiber, the cellulose acetate composition of the present disclosure, and a cellulose acetate fiber and a cellulose acetate composition produced by the production methods of the present disclosure can be widely used, for example, for fibers; sanitary products, such as disposable diapers and menstrual sanitary products; tobacco filters; paints; and cosmetics.

EXAMPLES

Hereinafter, the present invention will be specifically described with reference to examples, but the technical scope of the present invention is not limited by these examples.

Each physical property of Examples and Comparative Examples to be described later were evaluated by the following methods.

Combined Sulfuric Acid Content

The combined sulfuric acid content was measured as a content in terms of $SO_4^{2-}$ by burning a dried cellulose acetate in an electric oven at 1300° C., trapping sublimated sulfurous acid in a 10% hydrogen peroxide water, and titrating with a normal aqueous solution of sodium hydroxide. The measured value was expressed in ppm as a sulfate content in 1 g of the cellulose ester in the absolute dry state.

Average Degree of Substitution

The combined acetic acid was determined by a method for measuring the combined acetic acid specified in ASTM:D-817-91 (Test method of cellulose acetate and the like). First, 1.9 g of dried cellulose acetate (sample) was precisely weighed and dissolved in 150 mL of a mixed solvent of acetone and dimethylsulfoxide (volume ratio 4:1), and then 30 mL of a 1 N aqueous sodium hydroxide solution was added to saponify the cellulose acetate at 25° C. for 2 hours. Phenolphthalein was added as an indicator, and excess sodium hydroxide was titrated with 1 N-sulfuric acid (concentration factor: F). Further, a blank test was performed in the same manner, and the combined acetic acid was calculated by the following formula:

Degree of acetylation (%)=[6.5×(B−A)×F]/W where A represents the titration volume (mL) of the 1 N sulfuric acid for the sample, B represents the titration volume (mL) of the 1 N sulfuric acid for the blank test, F represents the concentration factor of the 1 N sulfuric acid, and W represents the weight of the sample.

The calculated combined acetic acid was converted by the following equation to determine the average degree of substitution:

Average degree of substitution (DS)=162.14×the combined acetic acid (%)/{6005.2−42.037×degree of acetylation (%)}

Viscosity-Average Degree of Polymerization

Cellulose acetate was dissolved in dimethylacetamide (DMAc) to prepare a solution having a concentration of 0.002 g/mL. Then, the specific viscosity ($\eta_{rel}$, unit: mL/g) of this solution at 25° C. was determined by an ordinary method using an Ostwald viscometer. The natural logarithm of the specific viscosity was divided by the concentration (unit: g/mL) to approximately determine a value of intrinsic viscosity ([η], unit: mL/g).

$\eta_{rel}=T/T_0$

[η]=(ln $\eta_{rel}$)/C where T represents the efflux time (in seconds) of the measurement sample, To represents the efflux time (in seconds) of the solvent alone, and C represents the concentration (g/mL).

The viscosity-average molecular weight was determined by the following equation:

Viscosity-average molecular weight=([η]/$K_m$)$^{1/\alpha}$

Here, $K_m$=0.0264 and α=0.750 were used.

Temperature at which Weight Loss Reaches 5%

The weight change by heating was measured using a thermobalance (TG-DTA2000-S available from MAC Science Co., Ltd.). Specifically, the weight change was examined at a heating rate of 10° C./min under a nitrogen atmosphere. A temperature at which a weight loss reaches 5% is a temperature at which a 5% weight loss relative to weight at 100° C. was observed.

X-Ray Diffraction

A water suspension of cellulose acetate fibers obtained in the defibrillation step was filtered to separate a solid, and the solid was freeze-dried. The solid was subjected to powder X-ray diffraction using an X-ray diffraction measurement device SmartLab available from Rigaku Corporation and a non-reflecting silicon plate.

Comparative Example 1

Pretreatment

First, 40 parts by weight of softwood bleached kraft pulp (SP, available from Nippon Paper Industries Co., Ltd.) was pretreated by stirring in 2000 parts by weight of water at room temperature for 1 hour. Liquid was removed by suction filtration to obtain a wet cake having a solid content concentration of about 20 wt. %. This wet cake was dispersed in 2000 parts by weight of glacial acetic acid, and the dispersion liquid was stirred at room temperature for 10 minutes. Liquid was removed by suction filtration, and a wet cake (SP) wetted with acetic acid was obtained. The solid content concentration of this acetic acid-wetted wet cake (SP) was about 35 wt. %. An operation of dispersing this wet cake (SP) wetted with acetic acid in glacial acetic acid again and removing liquid was performed twice. The solid content concentration of the acetic acid-wetted wet cake (SP) thus obtained was about 40 wt. %. The solid content concentration of the wet cake was measured by the method described above.

Acetylation

A poor solvent for cellulose acetate was prepared by mixing 648 parts by weight of toluene, 72 parts by weight of acetic acid, 240 parts by weight of acetic anhydride, and 6 parts by weight of concentrated sulfuric acid to prepare a mixture (mixed solvent). The temperature of this mixture was adjusted to 25° C., the wet cake (SP) was added to the mixture, and the mixture was stirred at 25° C. for 3 hours to form a reaction mixture. This reaction mixture was cooled to room temperature, the resulting solid was suction-filtered, and the solid was recovered. An operation of immediately washing this solid with 800 parts by weight of toluene was repeated twice to remove acetic anhydride and sulfuric acid associated with the solid, and thereby the acetylation reaction was stopped.

Washing

The solid, which was fibrous crude cellulose acetate, was further washed with 800 parts by weight of ethanol twice and with 800 parts by weight of water four times, and a wet fibrous cellulose acetate was formed.

Drying

Figure 1:
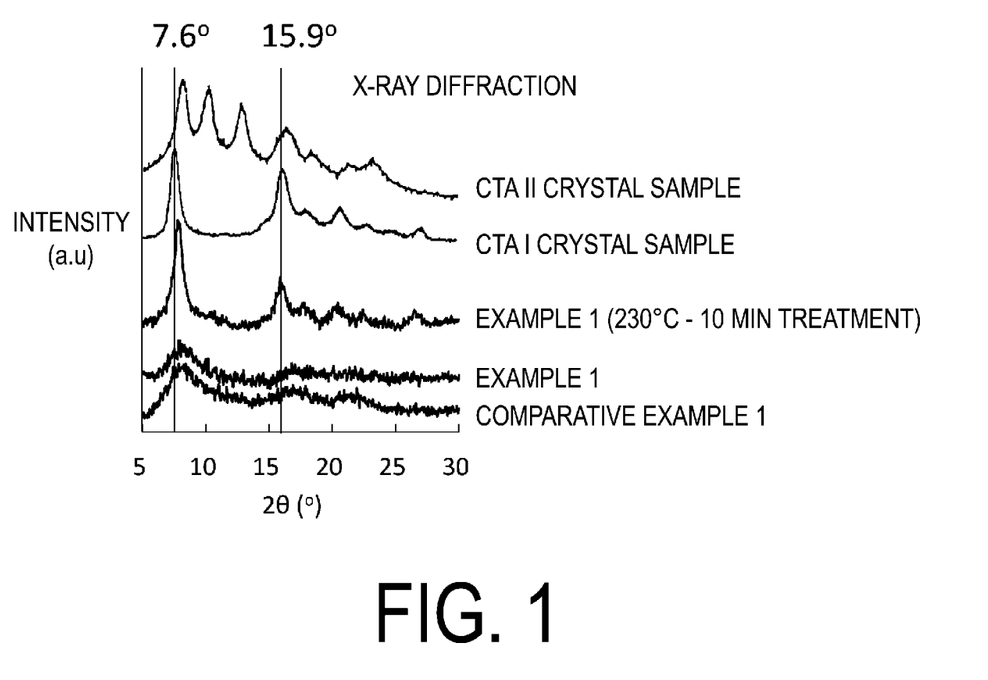
FIG. 1 is a chart showing X-ray diffraction results of cellulose acetate.
Figure 2:
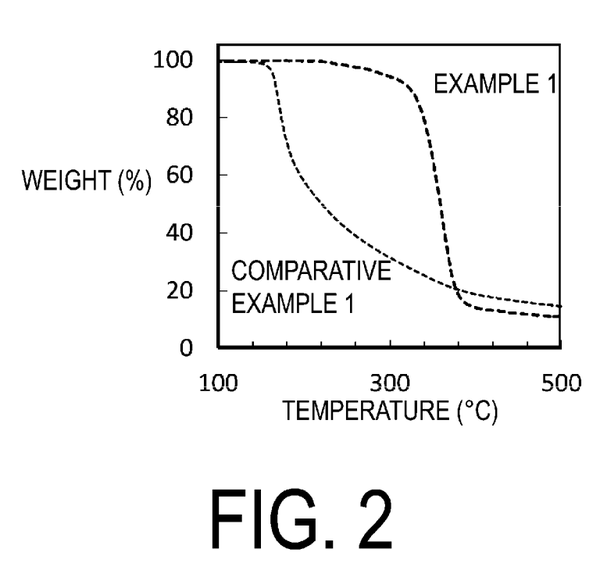
FIG. 2 is a graph showing changes in weight of cellulose acetate during heating.

The wet fibrous cellulose acetate was freeze-dried to constant weight, and a fibrous cellulose acetate was formed. The resulting cellulose acetate was evaluated for the combined sulfuric acid content, the average degree of substitution, the viscosity-average degree of polymerization, and a temperature at which the weight loss reached 5%, and each result is shown in Table 1. The result of the X-ray diffraction is shown in FIG. 1. The result of measuring the weight change by heating is shown in FIG. 2.

Example 1

A dispersion liquid was prepared by dispersing 10 parts by weight of the cellulose acetate produced in Comparative Example 1 in 300 parts by weight of water. Then, 1 M sulfuric acid was added to adjust the proton concentration of the dispersion liquid to 3 mM. The temperature of the dispersion liquid was increased to 90° C. over 25 minutes under stirring. The proton concentration of the dispersion liquid was 15 mM as measured by collecting a small amount of the dispersion liquid after increasing the temperature. The increase in proton concentration was due to the elimination of sulfate bound to the cellulose. The dispersion liquid was further stirred at 90° C. for 6 hours. The proton concentration of the dispersion liquid was 45 mM as measured by collecting a small amount of the dispersion liquid after stirring for 6 hours. The dispersion liquid was cooled to near room temperature, and liquid was removed by suction filtration. The solid was washed with 300 parts by weight of distilled water and dried at 80° C. under reduced pressure to constant weight. The resulting cellulose acetate was evaluated for the combined sulfuric acid content, the average degree of substitution, the viscosity-average degree of polymerization, and a temperature at which the weight loss reached 5%, and each result is shown in Table 1. The result of the X-ray diffraction is shown in FIG. 1. The result of measuring the weight change by heating is shown in FIG. 2.

TABLE 1

| | Combined sulfuric acid content (ppm) | Average degree of substitution (—) | Viscosity-average degree of polymerization (—) | Temperature at which weight loss reached 5% (° C.) |
|---|---|---|---|---|
| Comparative Example 1 | 17525 | 2.90 | 717 | 163 |
| Example 1 | 290 | 2.34 | 566 | 284 |

Cellulose triacetate I crystals having a parallel-chain structure are known to exhibit high intensity diffractions at $2\theta=7.6°$ and $15.9°$ in X-ray diffraction. Cellulose triacetate II crystals having an antiparallel-chain structure are known to exhibit high intensity diffractions at $2\theta=8.4°$, $10.4°$, and $13.1°$.

As is clear from FIG. 1, the cellulose acetate of Comparative Example 1 was measured by X-ray diffraction and exhibited high intensity diffractions at $2\theta=7.9$ and $15.8°$. Therefore, the cellulose acetate of Comparative Example 1 was considered to have a cellulose triacetate I crystal structure. The cellulose acetate of Example 1 exhibited high intensity diffractions at $2\theta=7.9$ and $15.8°$. Therefore, the cellulose acetate of Example was considered to have a cellulose triacetate I crystal structure. To facilitate the observation of the crystal structure of the cellulose acetate of Example 1, the cellulose acetate of Example 1 was turned into a glassy state, crystallization was promoted, and crystallinity was increased. Specifically, the cellulose acetate of Example 1 was treated at 230° C. for 10 minutes under a nitrogen atmosphere, and then X-ray diffraction was measured. As a result, the cellulose acetate exhibited high intensity diffractions at $2\theta=7.8$ and $15.8°$ and was also considered to have a cellulose triacetate I crystal structure.

As shown in FIG. 2, the cellulose acetate of Example 1 apparently had less weight change by heating compared with Comparative Example 1. A temperature at which the weight loss relative to weight at 100° C. reached 5% was 284° C. in Example 1 and 163° C. in Comparative Example 1. The cellulose acetate of Example 1 has thus quite excellent thermal stability.

Strength of Resin

The strength of a resin was evaluated by preparing a resin molded article by the following procedures (1) to (4) and performing (5) a tensile test.

(1) Defibrillation of Cellulose Acetate

The cellulose acetate produced in Example 1 was the cellulose acetate produced by removing the combined sulfuric acid from the cellulose acetate produced in Comparative Example 1. In 10000 parts by weight of water, 100 parts by weight of the cellulose acetate from which the combined sulfuric acid had been removed produced in Example 1 was suspended. The dispersed sample was pre-defibrillated with an Excel Auto Homogenizer (available from NISSEI Corporation) and then defibrillated by processing twice using a straight nozzle (100 MPa) and three times using a cross nozzle (140 MPa) of a high-pressure homogenizer (L-AS) (product name) (available from Yoshida Kikai Co., Ltd.). A 1 wt. % dispersion liquid of the defibrillated product of the cellulose acetate from which the combined sulfuric acid had been removed was thus produced. This was further diluted with distilled water, and a 0.5 wt. % dispersion liquid of the defibrillated product of the cellulose acetate from which the combined sulfuric acid had been removed was produced.

(2) Preparation of PEG-Lignin (PEGL)

In 1200 parts by weight of polyethylene glycol (PEG400) with a molecular weight of 400, 240 parts by weight of cedar tips were immersed, and concentrated sulfuric acid was added to a concentration of 0.3 wt. % relative to PEG400. The mixture was heated at 160° C. for 4 hours to digest the cedar tips. After the digestion, the mixture was immediately cooled to room temperature to stop the reaction, and reaction products were separated by filtration into a solid (pulp) and filtrate. The pulp was washed with 4800 parts by weight of an aqueous 1,4-dioxane solution with a 1,4-dioxane concentration of 80 wt. %. The filtrate was added to the washing solution, and then 1,4-dioxane was distilled off under reduced pressure. The remaining black solution was heated at 140° C. for 2.5 hours and then poured into 16000 parts by weight of distilled water. Centrifugation (11590×g (8000 rpm), 15 minutes, 4° C.) and replacement of the distilled water were repeated until the supernatant became transparent, then the recovered precipitate was subjected to freeze drying, and a powder PEGL was produced.

(3) Preparation of Mixture of Lignin Resin and Maleic Anhydride

First, 50 parts by weight of distilled water and 8 parts by weight of a 0.5 wt. % dispersion liquid of the defibrillated product of the cellulose acetate from which the combined sulfuric acid had been removed obtained by (1) defibrillation of cellulose acetate above were mixed. Furthermore, 1.2 parts by weight of polyethylene glycol with a molecular weight of 500000 (PEG 500 kDa) was added, and the mixture was stirred. The stirring was carried out at room temperature for 1 day. Moreover, 1.66 parts by weight of the PEGL produced in (2) preparation of PEG-lignin (PEGL) above was added, and the mixture was stirred at room temperature for 1 day and then subjected to freeze drying. The freeze-dried product was milled with a blender, and a mixed powder of the cellulose acetate defibrillated product, the PEGL, and the PEG 500 kDa was obtained. Then, 0.145 parts by weight of this mixed powder and 0.057 parts by weight of maleic anhydride were mixed well in a mortar, and a mixture of the lignin resin and maleic anhydride was produced.

(4) Preparation of Lignin Resin Molded Article

A Teflon sheet (Naflon Tape available from NICHIAS Corporation) with a thickness of 0.05 mm was spread on a press plate of an oil hydraulic press machine (HP-300TL-S model available from *Eucalyptus* Giken Co., Ltd.), and a frame (frame size: 50 mm×50 mm) made of a similar Teflon sheet was placed. Then, 0.15 g of the mixture of the lignin resin and maleic anhydride produced in (3) preparation of mixture of lignin resin molded article and maleic anhydride above was spread in a disc shape in the center of the frame and was covered with the Teflon sheet. The temperature of this preparation was increased from room temperature, and when 150° C. was reached, the preparation was pressed at a pressure of 5 MPa. The temperature was then kept increased, and after the temperature reached 170° C., the temperature was maintained for 6 hours. The material was cooled to near room temperature, and a film-like and free-standing lignin resin molded article containing cellulose acetate was produced between the Teflon sheets.

(5) Tensile Test

Figure 3A:
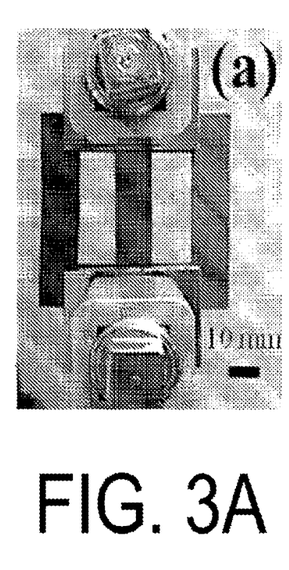
FIG. 3A is a photograph showing an example of a state in which a film test piece is sandwiched between frames and fixed in a material testing machine.
Figure 3B:
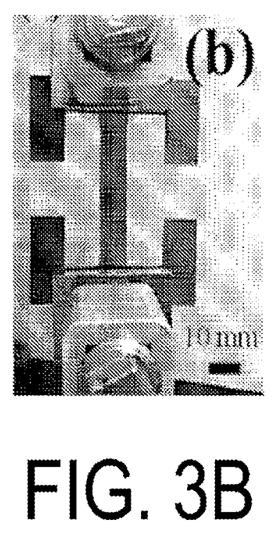
FIG. 3B is a photograph showing an example of a state of a film test piece during a tensile test.
Figure 4:
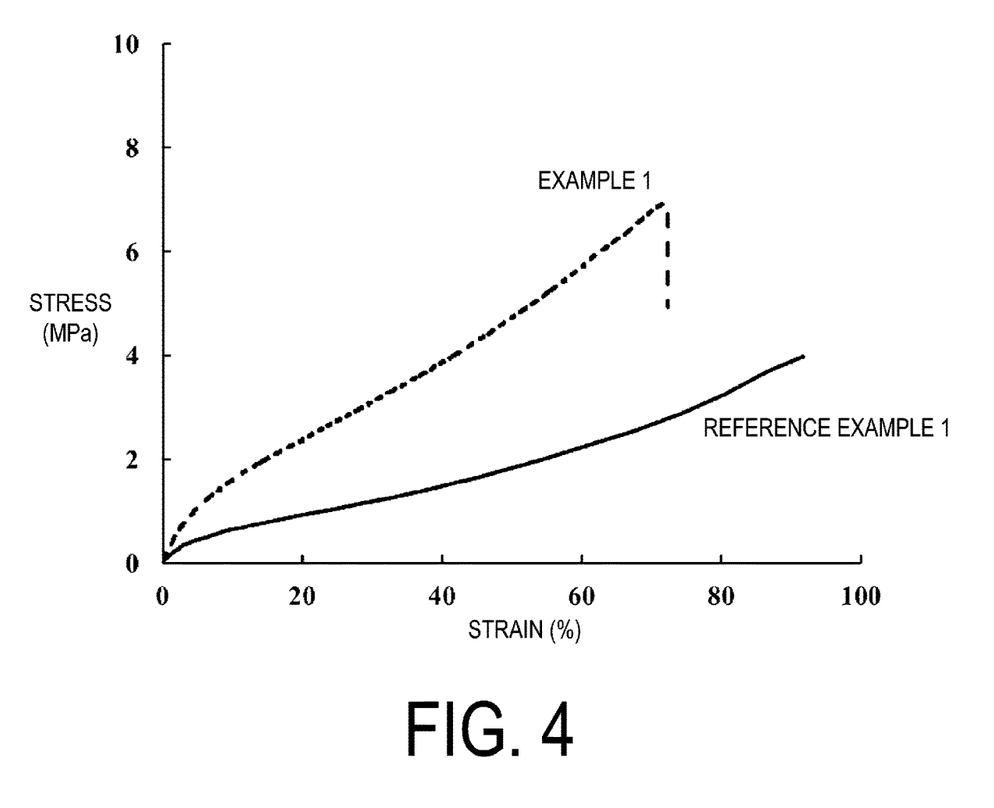
FIG. 4 is a graph showing curve of cellulose acetate compositions containing a cellulose acetate fiber and a resin.

A 50 mm×10 mm strip-shaped test piece was cut out from the film-like lignin resin molded article. This cut out test piece is also referred to as a film test piece. The thickness of the test piece was measured with a digital outside micrometer (MCD130-25 available from Niigata Seiki Co., Ltd.), and then both ends of the test piece were sandwiched with paper frames and fixed as illustrated in FIG. 3A. After cutting the paper frames, the test piece in this state was tested by tensile test as illustrated in FIG. 3B using a material testing machine (Autograph AGS-500D available from Shimadzu Corporation), and a stress-strain diagram was obtained. A 50 N load cell was used at a test speed of 10 mm/min and a free length of test piece between grips of 30 mm. The result is shown in FIG. 4. The molded article containing the cellulose acetate of Example 1 showed a maximum stress of about 180% relative to that of a molded article of Reference Example 1 described below.

Reference Example 1

A film-like and free-standing lignin resin molded article was produced in the same manner according to the procedures described in (2) preparation of PEG-lignin (PEGL), (3) preparation of mixture of lignin resin and maleic anhydride, and (4) preparation of lignin resin molded article above, except for using 58 parts by weight of distilled water instead of the mixed liquid of 50 parts by weight of distilled water and 8 parts by weight of the 0.5 wt. % dispersion liquid of the defibrillated product of the cellulose acetate from which the combined sulfuric acid had been removed in (3) preparation of mixture of lignin resin and maleic anhydride above. In addition, tensile testing was performed in the same manner as in (5) tensile test above, and a stress-strain curve was obtained. The result is shown in FIG. 4.

As shown in FIG. 4, the resin composition containing the cellulose acetate of Example 1 has quite excellent strength. The cellulose acetate of Example 1 thus has an excellent effect of resin reinforcement.

The invention claimed is:

1. Cellulose acetate having a cellulose triacetate I crystal structure, wherein
   a temperature at which a weight loss of cellulose acetate relative to weight at 100° C. reaches 5% is 200° C. or higher when the cellulose acetate is heated at a heating rate of 10° C./min under a nitrogen atmosphere.

2. The cellulose acetate according to claim 1, wherein a temperature at which the weight loss reaches 5% is 220° C. or higher.

3. The cellulose acetate according to claim 2, wherein a combined sulfuric acid content is 20 ppm or greater and 500 ppm or less.

4. A cellulose acetate fiber comprising the cellulose acetate described in claim 2.

5. The cellulose acetate according to claim 1, wherein a temperature at which the weight loss reaches 5% is 250° C. or higher.

6. The cellulose acetate according to claim 5, wherein a combined sulfuric acid content is 20 ppm or greater and 500 ppm or less.

7. A cellulose acetate fiber comprising the cellulose acetate described in claim 3.

8. The cellulose acetate according to claim 1, wherein a combined sulfuric acid content is 20 ppm or greater and 500 ppm or less.

9. A cellulose acetate fiber comprising the cellulose acetate described in claim 1.

10. A cellulose acetate composition comprising the cellulose acetate fiber described in claim 9 and a resin.

11. A method for producing cellulose acetate composition, the method comprising melt-kneading a resin in a presence of the cellulose acetate fiber described in claim 9.

* * * * *